United States Patent [19]
Roth

[11] Patent Number: 5,406,324
[45] Date of Patent: Apr. 11, 1995

[54] SURVEILLANCE SYSTEM FOR TRANSMITTING IMAGES VIA A RADIO TRANSMITTER

[76] Inventor: Alexander Roth, 53 Clifford Rd., Sudbury, Mass. 01776

[21] Appl. No.: 969,101

[22] Filed: Oct. 30, 1992

[51] Int. Cl.⁶ ............................................. H04N 7/18
[52] U.S. Cl. .................................... 348/22; 348/143; 348/148
[58] Field of Search .................. 358/108, 469; 379/53; 348/24, 22, 143, 148; H04N 7/18

[56] References Cited

U.S. PATENT DOCUMENTS

| | | | |
|---|---|---|---|
| 4,483,011 | 11/1984 | Brown | 358/148 |
| 4,596,985 | 6/1986 | Bongard et al. | |
| 4,628,309 | 12/1986 | Allias | |
| 4,711,994 | 12/1987 | Greenberg | |
| 4,766,596 | 8/1988 | Michels-Krohn et al. | |
| 4,805,222 | 2/1989 | Young et al. | |
| 4,823,393 | 4/1989 | Kawakami | 340/825.34 |
| 4,831,438 | 5/1989 | Bellman, Jr. et al. | 358/108 |
| 4,857,912 | 8/1989 | Gombrich et al. | |
| 4,878,049 | 10/1989 | Ochiai et al. | |
| 4,975,978 | 12/1990 | Ando et al. | |
| 4,993,068 | 2/1991 | Piosenka et al. | |
| 5,033,007 | 7/1991 | Kameda | |
| 5,041,826 | 8/1991 | Milheiser | |

*Primary Examiner*—Howard W. Britton
*Attorney, Agent, or Firm*—Wolf, Greenfield & Sacks

[57] ABSTRACT

An image transmission surveillance system using a radio having a remote transmitter and a base receiver provides a camera for converting visual images into an electrical signal. The electrical signal is converted by an audio module into an audio signal for transmission by the radio. A computer connected with the base receiver converts audio signals received from the audio module into image data. This data is stored in a data storage device of the computer for later review on a monitor or similar image viewing device. The audio signal can be converted into audible sound for receipt by the radio microphone.

31 Claims, 4 Drawing Sheets

SURVEILLANCE SYSTEM FOR TRANSMITTING IMAGES VIA A RADIO TRANSMITTER

FIELD OF THE INVENTION

The present invention relates to remote surveillance systems and more particularly to a video imaging system that can transmit images over two-way radio voice line channel.

BACKGROUND OF THE INVENTION

It is often desirable to provide a system that photographs subjects at remote locations and transmits data representative of the photograph to a base location. As concerns over security increase, more locations, such as automatic tellers (ATMs), have incorporated a photographic identification system in order deter thefts and unlawful acts. Such systems make routine surveillance images of subjects as they present themselves at the location to be protected. By storing images of persons as they present themselves at a location, they are less likely to commit a crime since the image has "pre-witnessed" them.

Images accumulated by a surveillance system are stored on video tape or by other means for later processing. In the event that a wrongful act occurs at a remote location in which images are collected, the images can be cross matched to the approximate time of the act and the identity of the subject, based upon reviewed images can be ascertained. Since the images are stored off-site, the subject cannot access it, thus preventing tampering with the storage device.

While the above-described surveillance systems have become increasingly common at permanent fixed locations, the use of such surveillance in mobile applications has been more problematic. It can prove difficult and unreliable to store the images on board a vehicle since they are prone to tampering. Conversely, storing images at a remote location requires a form of two-way communication with the vehicle in order to transfer the images to the remote base station.

In transferring images, at least two problems arise. First, a reliable transmission medium (radio, for example) and band must be utilized which usually entails the dedication of a specific frequency or frequencies for image transfer. Second, the transmission band must be adaptable to transmit reliable image data over a sufficient distance to insure high reliability within a designated operating range.

The problem of establishing a dedicated transmission band can, itself, dissuade the use of image surveillance in many applications where it may prove economically unfeasible to provide dedicated one or two-way telecommunication links. A typical environment in which surveillance of subjects may be particularly desirable is in the taxicab industry. Taxis are often operated at late hours of night in remote parts of a town or city, Taxi drivers tend to work alone and carry large sums of cash on board. All of these factors have made taxicabs and their drivers an ever increasing target of theft and armed robbery. The ability to remotely store images of passengers, before or as they enter the taxi, would invariably serve to deter would-be thieves from carrying out their plans.

However, as noted above, taxicabs, like other mobile based industries, are often operated at a narrow cost margin and the addition of dedicated transmission lines can prove an unacceptable cost. Additionally, any transmission band chosen, must be adapted to provide reliable communication throughout a wide area of operation, around large buildings and over background interference. These problems can limit the number of bands available for use with an image transmission system.

The ability to transmit scanned images would also be desirable for police wishing to identify suspects or victims and medical and fire personnel wishing to identify a subject.

In view of above-described disadvantages, it is one object of this invention to provide a low cost and versatile image transfer system for use in vehicles such as taxicabs.

It is yet another object of this invention to provide an image transmission system that is relatively easy to operate and that utilizes low cost hardware.

It is yet another object of this invention to provide an image transmission system that does not require dedicated transmission lines or bands.

SUMMARY OF THE INVENTION

This invention relates to an image transmission surveillance system that uses a two-way radio, typically used for voice line communication, having a remote transmitter and a base station receiver. A camera utilizing, for example, a CCD solid state element creates an electrical video signal from an observed image. The electrical video signal is processed by an on-board microprocessor, having a frame grabber routine, into a digital signal that is converted, by a waveform generator, into an audio signal. The audio signal is acoustically coupled to a standard radio microphone.

The audio signal picked up by the microphone (or directly routed electronically to the radio) is then transmitted, via the radio, to a remote base station. The base station receives the signal and typically produces a square wave so that the time between zero crossings can be accurately measured. The measured signal represents image pixel values that are then stored in the base station computer. The image is identified, for example, by a discrete identification signal unique to the camera unit and is stored with this identifier in a computer data storage medium for subsequent review, should it be necessary to do so.

In a preferred embodiment, the signal generated by the camera can include an initiation signal that notifies the base station computer that an image signal is being received. The camera can include a variety of options such as an automatic illumination source for illuminating the subject to enhance image quality. Image file storage can include routines that automatically erase the stored image after a given period of time.

BRIEF DESCRIPTION OF THE DRAWINGS

The foregoing and other objects and advantages of this invention will become more clear with reference to the following detailed description of the preferred embodiment as illustrated by the drawings in which.

DETAILED DESCRIPTION

Figure 1:
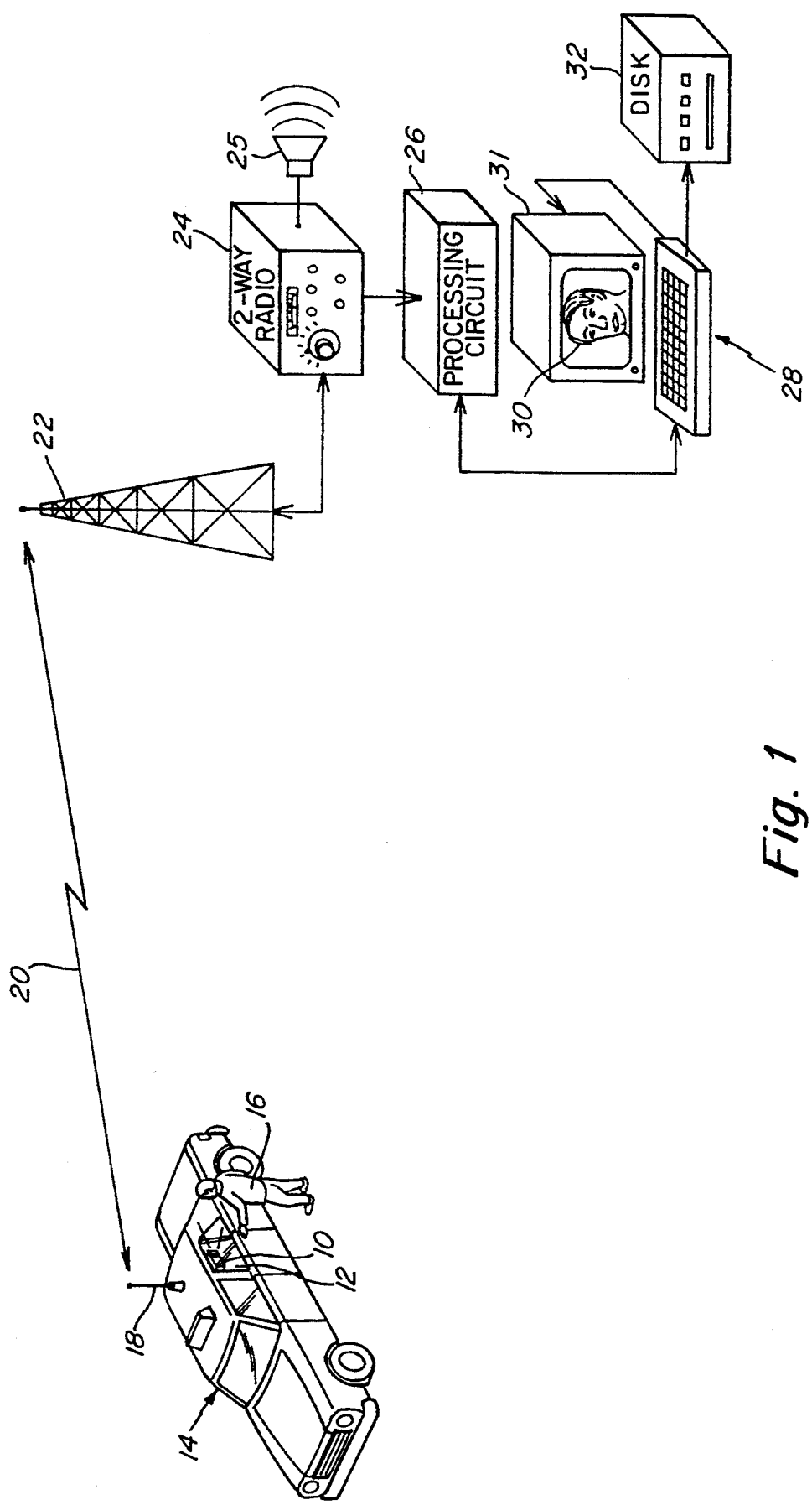
FIG. 1 is a schematic diagram of an image transmission surveillance system according to this invention.

An implementation for a vehicle borne image transmission surveillance system is shown schematically in FIG. 1. In this embodiment, a camera unit 10 is positioned on a window 12 of a vehicle 14, which is in this example a taxi, to capture the image of a potential passenger 16 standing in proximity to the vehicle 14. As will be described further below, the implementation according to this embodiment utilizes a standard two-way radio transceiver commonly employed in trucks, taxis and police/fire vehicles. Such a radio is well suited for urban use and operates in various frequency bands throughout the radio spectrum. The transceiver in the vehicle transmits a radio signal 20 via an antenna 18 that is received by a base station antenna 22 that routes incoming signals to a two-way base station radio 24 having a loudspeaker 25. The signal 20 is processed through signal processing circuitry 26 and delivered as a digital signal to a computer 28 that processes the digital signal into a scanned image 30 of the potential passenger 16. This image 30 is displayed, for example, on a monitor 31. For identification purposes, the camera 10 focuses upon the passenger's face, which is of the most value in positively identifying the passenger in the event that identification is necessary at a later time. Information scanned by the computer 28 need not be displayed immediately but, rather, can be stored in a storage medium such as a computer hard disk 32 for future review.

Figure 2:
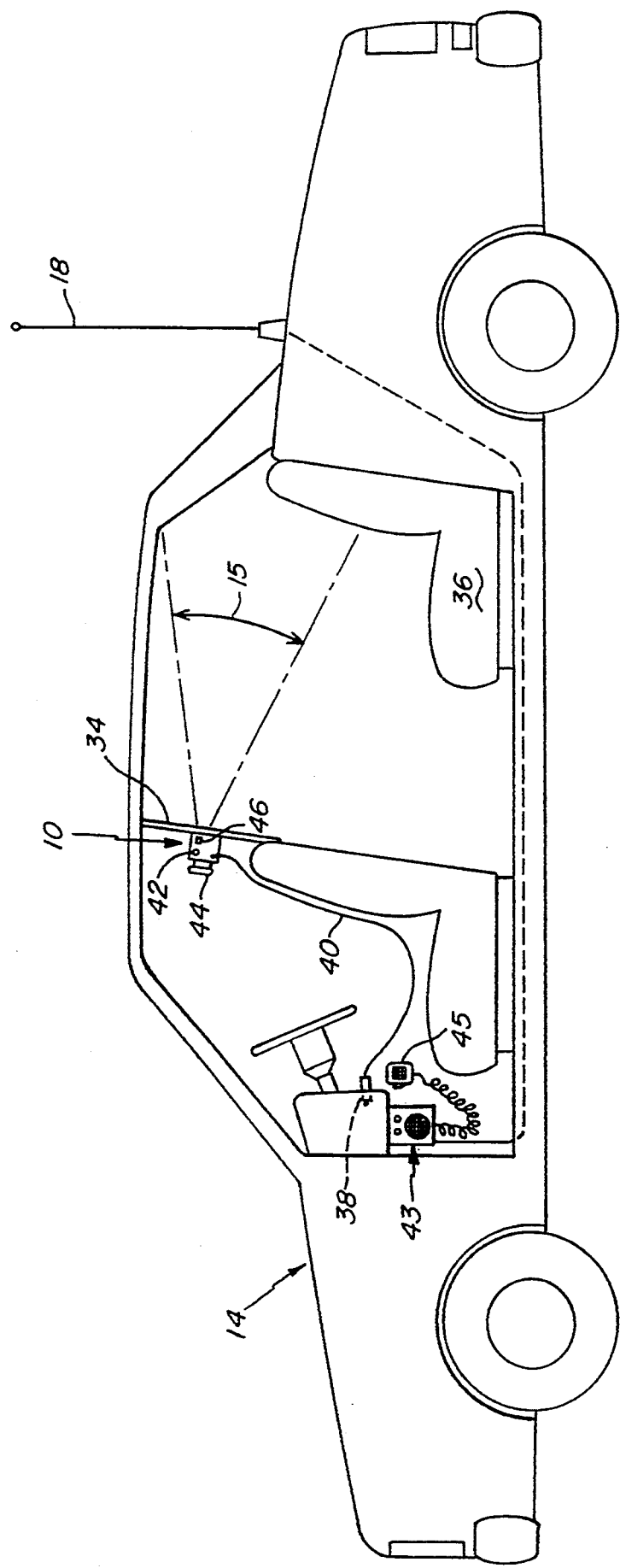
FIG. 2 is a fragmentary schematic cross sectional view of a vehicle having an image transmission camera unit in an alternative location according to this invention.

As shown in FIG. 2, the camera 10 according to this embodiment comprises a relatively small self-contained unit that, in this example, is mounted on a plastic security shield 34 facing the passenger seat 36 of the vehicle 14. In such an embodiment, the passenger's image would be taken soon after he entered the vehicle 14. The image field 15 should be sufficient to adequately view the passenger's face. The camera 10 can be powered by standard 12 volt DC current available, for example, from the cigar lighter socket 38 via a cord 40 as shown in FIG. 2. A pilot light 42 indicates that the power is on.

Figure 3:
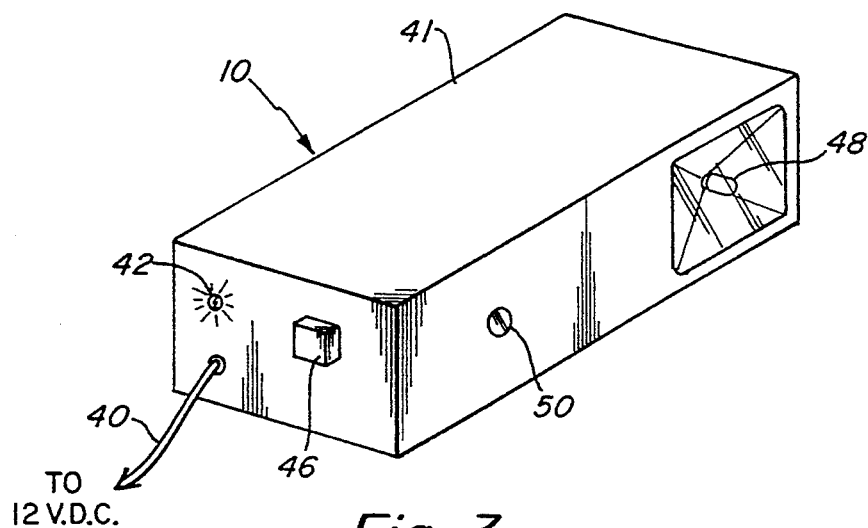
FIG. 3 is a somewhat schematic perspective view of a camera unit according to this invention.
Figure 3A:
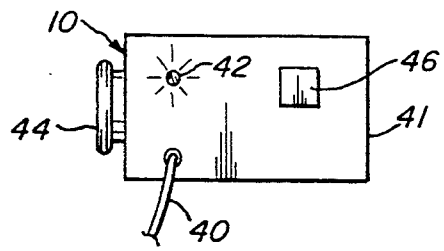
FIG. 3A is a side view of the camera unit of FIG. 3.

As noted above, one object of the present invention is to provide a surveillance system that is readily adaptable with existing vehicle equipment. Accordingly, the vehicle's standard two-way radio 43 transceiver having a keyed handheld microphone 45 need not be altered to utilize the camera 10 according to this invention. As further detailed in FIGS. 3 and 3A, the camera unit 10 includes a housing 41 having a rubber cup 44 that serves as an audio coupler. A loudspeaker (not shown) is located within the cup 44. In order to transmit a video image, the user need only announce to the base station that an image is forthcoming and then key the radio microphone 45 while applying it to the audio coupler cup 44.

The viewed image is transmitted by pressing the camera start button 46 while holding and keying the microphone. The start button 46 causes the built-in high intensity lamp 48 to illuminate the passenger so that the camera imaging element 50 can receive a bright and clear reflected image. The image is processed by the camera's microprocessor 52 into an audio signal that is output from the loudspeaker to the microphone 45.

Figure 4:
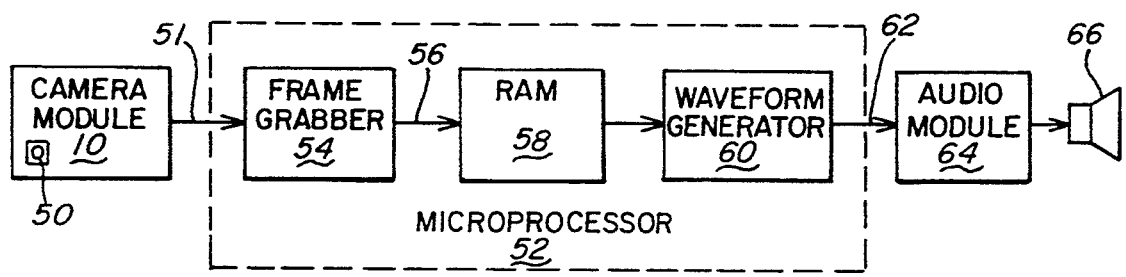
FIG. 4 is a block diagram of the camera unit and transmission circuitry according to this invention.

The block diagram of FIG. 4 depicts the specific implementation of the camera 10 according to this embodiment. The imaging element 50 of the camera 10 is a solid state CCD camera that transmits a video signal 51 to a microprocessor 52 having a frame grabber function 54 programmed thereinto. The frame grabber 54 locates the starting and ending points of an image field of the video signal 51. It converts the amplitude of the video signal 51 into a digital signal 56 and stores the digital values of the signal in a random access memory (RAM) 58. In a typical embodiment, an image comprising 64×88 pixels can be generated (a total of 5632 pixels). Each pixel comprises a single digital number. The numbers can be single bytes of 8 bits per number or 256 values of gray. For a typical image, 24 levels of gray is generally adequate.

The microprocessor 52 also includes a waveform generator 60 that sequentially calls each value from the RAM 58 and converts the value into a waveform signal 62 that can be coded and then later decoded with the stored digital value of the pixel. The waveform 62 is transmitted to an audio module 64 that generates a series of audible tones at the loudspeaker 66.

Figure 4A:
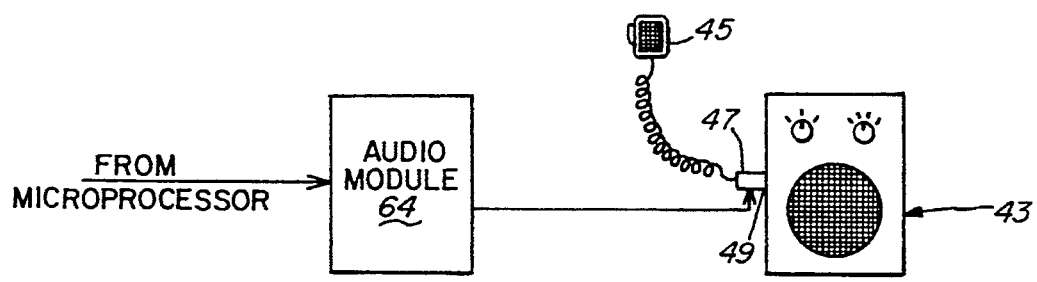
FIG. 4A is a schematic diagram of a direct audio-to-radio connection according to an alternative embodiment.

While an audio coupler is utilized according to this invention to ensure greatest adaptability to existing radio equipment, it is contemplated that certain radios can be adapted without undue modification to provide a direct audio link from the camera 10 to the radio without requiring an audible sound wave link. In one such implementation as illustrated in FIG. 4A, the radio 43 can include a splitter module 47 that routes the sine wave signal generated by the camera 10 through a microphone connection port 49 on the radio 43 at chosen times. The microphone can still be utilized when desired. As used herein, "audio signal" shall refer to the underlying speaker-driving electrical signal while "audible audio signal" shall refer to sound wave tones generated by the speaker.

In one embodiment, the image is transmitted as a series of pixel values only, without any horizontal or vertical synchronizing signals. The width of a single sine wave cycle is made to vary with the digital value of the pixel. As such, the picture signal consists of a stream of 5632 width-modulated sine wave cycles. As will be described further below, the computer at the base station measures the width or duration of each sine wave cycle and assigns a digital value (generally a single byte) to the measured width. The 5632 values received become a picture file which is then stored in the disk 32. The values in this file corresponds to the pixel locations of the monitor screen 31 so the picture can be quickly and easily displayed if necessary.

Part of the signal transmitted by the microprocessor 52 comprises special tones at the initiation of transmission that are sufficiently distinct from random noise or voices so that the base station computer 28 can automatically recognize and respond to the image signals as they are received. In one embodiment, the initiation signal can comprise a repeating sequence of four sine waves. Two sine waves can be narrow while two are wide. For example, 128 repeating patterns can be sent, and if 32 patterns are detected, then the computer 28 proceeds to process an incoming image.

Since a primary purpose of the system according to this embodiment is to identify a passenger and place that passenger in a certain time and scene (i.e. in connection with a certain vehicle), the transmitted signal also includes a sequence of width modulated sine waves that include a vehicle or camera identification number. This number is decoded by the base station computer 28 and is used to form, for example, a name under which the image file is stored. This allows for a convenient retrieval of images received from specific vehicles. The file can also include a time signal that can be provided by the base station computer 28 at the time the file is formed.

While width modulation of sine waves is a preferred method according to this embodiment, a variety of other methods of transmitting image data are contemplated according to this invention including frequency modulation, phase modulation, and amplitude modulation among others.

Similarly, analog coding methods such as width modulation are preferred according to this embodiment, but other coding methods can be used including two-level binary coding in which each of four waves are then grouped to produce sixteen level values.

Figure 5:
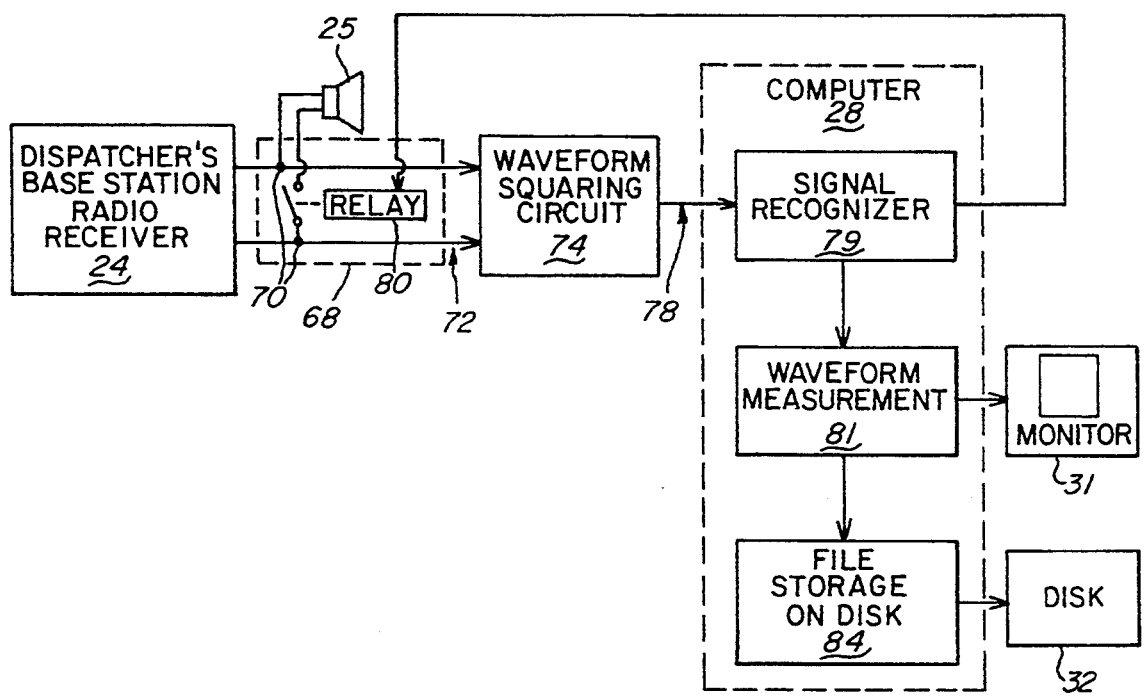
FIG. 5 is a block diagram of a base station circuitry for the image transmission surveillance system according to this invention.

Processing of the received radio signal 20 from the vehicle camera 10 is performed by the circuit shown in FIG. 5.

Figure 5A:
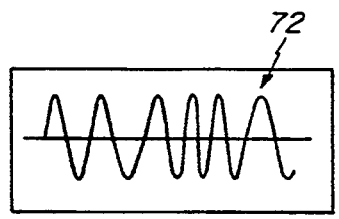
FIGS. 5A and 5B are schematic representations of base station sine wave and square wave audio signals, respectively, according to this invention.

The loudspeaker circuit 68 of the base station radio receiver 24 according to this embodiment includes a tap 70 that routes the audio output signal 72 to a waveform squaring circuit 74. As shown, the sine wave audio signal 72 (see FIG. 5A) that drives the loudspeaker 25 is squared for digital processing. The waveform squaring circuit routes the squared signal 78 to the office's computer 28 (a standard microcomputer, for example) which, in this embodiment, includes software for recognizing the initiation signal tones described above. A generation and image storage program is activated by the initiation signal. The signal recognition block 79 can instruct the computer 28 to transmit a signal to a relay 80 interconnected with the radio loudspeaker 25. The relay 80, upon receipt of a signal from the computer 28, disconnects the loudspeaker 25 from the receiver radio base station 24. This feature is desirable where continuous transmission of audio image signals proves annoying to the dispatcher.

Figure 5B:
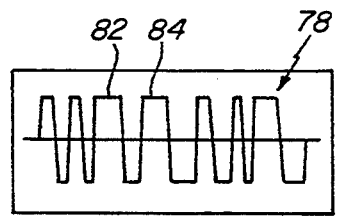

The squared signal 78 (see FIG. 5B), following recognition, is processed by the waveform measurement block 81 of the computer routine. Measurement of the signal 78 is made for each complete cycle from one positive edge (edge 82, for example) to the next (edge 84, for example). Different radio systems often have different polarities, so that it is necessary to establish which edges of the signal are to be used for measurement. The establishment of the edges for measurement can be accomplished by computing the RMS (Root Mean Square) of a small increment of transmitted values taken, for example, from the initiation signal. The signal is then inverted by the waveform measurement block 81 and the measurement of edges is repeated. Of the two inversions of the signal, the one which produces the largest RMS value indicates the appropriate edge for conducting pixel waveform measurements.

The waveform measurement block 81 measures the time between positive (or negative) edges of the signal.

The edge time values translate into pixel brightness values. The sequential set of values comprise the image file for storage on the disk. As noted above, the image file, at the time of storage, can be tagged with a time so that the approximate time in which the passenger entered the vehicle can be determined. The image can be simultaneously displayed on a monitor 31 or can be simply stored by a file storage routine block 84 on the disk 32 for later review if required.

The typical transmission time for a signal according to this embodiment is approximately four seconds. Hence, a minimum of two-way radio operating time is occupied.

The preferred embodiment of this invention can utilize a signal having the following characteristics:

| No. Cycles Transmitted | Approximate Duration Per Cycle (sec) | Description |
| --- | --- | --- |
| 256 | .001 | Prepares receiver for signal to follow. Allows receivers automatic gain adjust to stabilize. |
| 1 | .001 | Repeat this pattern of four |
| 1 | .001 | waves 128 times to provide an |
| 1 | .0005 | unmistakable recognizable signal. |
| 1 | .0005 | |
| 48 | .001 | The transition going from the |
| 48 | .0005 | wide to the narrow wave provides a reference point in the waveform stream to allow locating the start of the identification number and the start of the pixel values later on. |
| 48 | variable .001 or .0005 | This is a code sequence which carries the vehicle identification code. |
| 5632 | variable range .001 to .0005 | These are the width modulated pixel sinewaves. |

The file of images for the vehicle or vehicles in the system can be limited to store only a given maximum number of images. As new images, beyond a maximum number, are entered into the file, older stored images are erased to make room for the new images. The images are continually entered and deleted from the file in a first-in-first-out order. The disk storage should be large enough to insure storage of images for a sufficient length of time to permit contemporaneous retrieval of images if desired. In the case of a system for identifying taxicab passengers, between two and three days worth of storage is probably sufficient. Any wrongful act committed in a taxi is almost certain to be discovered within that period of time. Data storage limitations can make it undesirable to retain images substantially beyond a few days.

While not shown, the base station computer 28 can also include a hard copy printing device having sufficient resolution to insure positive identification of the passenger.

The foregoing has been a detailed description of a preferred embodiment. Various modifications and equivalents can be made without departing from the spirit and scope of this invention. This description is, therefore, meant to be taken only by way of example and not to otherwise limit the scope of the invention.

What is claimed is:

1. An image transmission surveillance system using a radio having a remote transmitter and a base receiver comprising:

a camera for converting visual images into an electrical signal;

an audio module for converting the electrical signal into a baseband audio signal for receipt by a microphone input of the radio, wherein the baseband audio signal comprises a digital representation of the image comprising a series of discrete tones, each tone having a wavelength corresponding to a discrete digital value for transmission as an RF audio signal;

a computer interconnected with the base receiver for converting the RF audio signals received from the audio module by the base receiver into image data; and a data storage device for storing the image data.

2. A surveillance system as set forth in claim 1 further including a microphone having an output;

an electrical connection having a first end and a second end, the first end connected to the audio module; and a tap for permitting audio signals to be received by the radio, the tap having a first input, a second input and an output, wherein the output of the microphone is attached to the first input of the tap, the second end of the electrical connection is attached to the second input of the tap, and the output of the tap is attached to the radio.

3. A surveillance system as set forth in claim 1 wherein the image data includes a computer file.

4. A surveillance system as set forth in claim 3 wherein the computer file includes a file name, a date stamp and a time of day stamp generated by the computer.

5. A surveillance system as set forth in claim 1 further including a waveform squaring circuit interconnected between the base receiver and the computer for converting the baseband audio signals into a square wave signal having defined edges.

6. A surveillance system as set forth in claim 5 wherein the computer includes a waveform measurement means and means for determining image pixel intensity from measured waveforms.

7. A surveillance system as set forth in claim 6 wherein the computer includes image data file storage memory for storing images in the form of pixel data.

8. A surveillance system as set forth in claim 1, further including a visual image, the visual image having a digital representation comprising a plurality of pixels, each pixel having one of a plurality of pixel intensity values.

9. A surveillance system as set forth in claim 8, wherein the electrical signal further comprises a series of voltage levels, each voltage level having at least one of a first voltage level and a second voltage level for a predetermined time interval.

10. A surveillance system as set forth in claim 9, wherein each pixel intensity value corresponds to a predetermined sequence of the series of voltage levels.

11. A surveillance system as set forth in claim 8, wherein the audio signal comprises a series of waveforms, each waveform having at least one of a first waveform having a first length and a second waveform having a second length for a predetermined time interval.

12. A surveillance system as set forth in claim 11, wherein each pixel intensity value corresponds to a predetermined sequence of the series of waveforms.

13. A surveillance system as set forth in claim 1 wherein the camera comprises a CCD solid state camera.

14. A surveillance system as set forth in claim 13 wherein the camera further includes an illumination source for illuminating a subject to be viewed by the camera.

15. A surveillance system as set forth in claim 13 further comprising a waveform generator interconnected between the camera and the audio module for transforming image data from the camera into the baseband audio signal for transmission by the audio module.

16. A surveillance system as set forth in claim 15 wherein the audio module includes an audio coupler constructed and arranged to generate the baseband audio signal from the audio signal and to transmit the airborne audio signal to a hand-held microphone.

17. A surveillance system as set forth in claim 13 wherein the camera further includes a means for generating a unique identification signal representative of the camera and the computer includes means for identifying the identification signal and storing the identification signal with image data derived from the signal.

18. A surveillance system as set forth in claim 17 further comprising means for storing image data based upon the identification signal so that image data relating to specific cameras can be accessed.

19. A surveillance system as set forth in claim 17 wherein the computer further comprises means for storing a time of receipt of the RF audio signal so that each image stored thereby includes a time of receipt data value.

20. An image transmission surveillance system using a radio having a remote transmitter and a base receiver comprising:

a camera for converting visual images into an electrical signal, wherein the camera comprises a CCD solid state camera, and wherein the camera further includes a frame grabber and digital memory for acquiring an image viewed by the camera;

an audio module for converting the electrical signal into a baseband audio signal for receipt by a microphone of the radio wherein the baseband audio signal comprises a digital representation of the image comprising a series of discrete tones, each tone having a wavelength corresponding to a discrete digital value for transmission as an RF audio signal;

a computer interconnected with the base receiver for converting the RF audio signals received from the audio module by the base receiver into image data; and a data storage device for storing the image data.

21. A method for transmitting images from a remote location having a transmitter to a base station having a receiver comprising the steps of:

storing data of a viewed image in digital form;

converting stored data into a baseband audio signal for receipt by a microphone input of the radio, wherein the baseband audio signal comprises a digital representation of the image comprising a series of discrete tones, each tone having a wavelength corresponding to a discrete digital value;

transmitting the baseband audio signal via the transmitter to the base station as an RF audio signal;

converting the baseband audio signal received by the base station into digital data representative of the image; and storing the digital data for subsequent review.

22. A method as set forth in claim 21 further comprising the steps of recognizing receipt of the RF audio signal at the base station and automatically deactivating a loudspeaker of the base station free of operator control thereof, in response to the step of recognizing.

23. A method as set forth in claim 21 further comprising the step of keying, by an operator, a microphone of the transmitter and locating the microphone adjacent a speaker, the speaker outputting the baseband audio signal, thereby entering the baseband audio signal into the transmitter for subsequent transmission to the base station.

24. A method as set forth in claim 21 further comprising the step of identifying an image of at least one subject from the stored digital data.

25. A method as set forth in claim 21 wherein the step of transmitting includes generating an audible audio signal from the audio signal and transferring the audible audio signal to the transmitter through a microphone.

26. A method as set forth in claim 25 further comprising illustrating the viewed image during the step of storing.

27. A method as set forth in claim 25 wherein the step of converting includes forming a square wave of the audio signal having edges and measuring distances between predetermined edges of the square wave.

28. A method as set forth in claim 27 wherein the step of converting further comprises deriving digital values from the distances of the edges and associating the digital values with image pixel values.

29. An image transmission surveillance system using a radio, having a remote transmitter, and a base receiver comprising:

a camera for converting visual images into a first electrical signal;

an audio module including a speaker for converting the first electrical signal into a baseband audio signal wherein the baseband audio signal comprises a digital representation of the image comprising a series of discrete tones, each tone having a wavelength corresponding to a discrete digital value for transmission as an RF audio signal;

the radio having a microphone for receiving the baseband audio signal and the remote transmitter for transmitting a radio signal representative of the baseband audio signal to the base receiver;

the base receiver receiving the radio signal and converting the radio signal into a second electrical signal;

a computer interconnected with the base receiver for converting the second electrical signal into image data; and a data storage device for storing the image data.

30. A surveillance system as set forth in claim 29 wherein the baseband audio signal comprises a series of discrete tones, each tone having a wavelength corresponding to a predetermined digital value.

31. A surveillance system as set forth in claim 30 wherein the predetermined digital value corresponds to one of a predetermined number of pixel intensities in the image.

* * * * *